(12) United States Patent
Ahn et al.

(10) Patent No.: US 10,814,903 B2
(45) Date of Patent: Oct. 27, 2020

(54) STEERING COLUMN ASSEMBLY FOR VEHICLE

(71) Applicants: Hyundai Motor Company, Seoul (KR); Kia Motors Corporation, Seoul (KR); MANDO Corporation, Pyeongtaek-si (KR)

(72) Inventors: Hyoung Jun Ahn, Daegu (KR); Joon Mo Park, Seoul (KR); Beom Soo Kim, Seoul (KR); Byung Woo Noh, Seoul (KR); Ji Yong Yim, Hwaseong-si (KR); Sung Hun Park, Anyang-si (KR); Dong Hun Shin, Seoul (KR); Ki Hong Kim, Seongnam-si (KR)

(73) Assignees: Hyundai Motor Company, Seoul (KR); Kia Motors Corporation, Seoul (KR); MANDO Corporation, Pyeongtaek-si (KR)

( * ) Notice: Subject to any disclaimer, the term of this patent is extended or adjusted under 35 U.S.C. 154(b) by 167 days.

(21) Appl. No.: 16/203,196

(22) Filed: Nov. 28, 2018

(65) Prior Publication Data

US 2019/0161109 A1 May 30, 2019

(30) Foreign Application Priority Data

Nov. 29, 2017 (KR) ........................ 10-2017-0161270

(51) Int. Cl.
*B62D 1/19* (2006.01)
*B62D 1/187* (2006.01)
(Continued)

(52) U.S. Cl.
CPC ............. *B62D 1/195* (2013.01); *B62D 1/181* (2013.01); *B62D 1/187* (2013.01); *B62D 7/224* (2013.01);
(Continued)

(58) Field of Classification Search
CPC ........ B62D 1/195; B62D 1/181; B62D 1/187; B62D 7/224; F16C 27/066
See application file for complete search history.

(56) References Cited

U.S. PATENT DOCUMENTS 4,616,522 A * 10/1986 White ................... B62D 1/195
188/376
8,899,622 B2 * 12/2014 Read ..................... B62D 1/181
280/775
9,145,160 B2 9/2015 Domig et al.

FOREIGN PATENT DOCUMENTS

JP 2719515 B2 11/1997
JP 5133844 B2 11/2012
(Continued)

*Primary Examiner* — Faye M Fleming
(74) *Attorney, Agent, or Firm* — Morgan, Lewis & Bockius LLP (57) ABSTRACT

A steering column assembly for a vehicle may include a buffer structure provided between a steering housing and a steering shaft inserted into the steering housing to distribute vibration applied thereto and to compensate for the distortion of the steering shaft and a clearance of the steering shaft with the steering housing, wherein a support structure is also provided to secure the support performance of the steering housing with respect to a mounting bracket in the event of a tilt and a longitudinal motion of the steering housing, ensuring the horizontal rigidity of the steering housing and reducing vibration applied thereto.

9 Claims, 9 Drawing Sheets

(51) Int. Cl.
  *B62D 1/181*   (2006.01)
  *B62D 7/22*    (2006.01)
  *F16C 27/06*   (2006.01)
  *F16C 29/00*   (2006.01)
  *F16C 3/02*    (2006.01)
(52) U.S. Cl.
  CPC ............ *F16C 3/023* (2013.01); *F16C 27/066* (2013.01); *F16C 29/002* (2013.01); *F16C 2326/24* (2013.01)

(56) References Cited

FOREIGN PATENT DOCUMENTS

| KR | 10-2005-0065997 A | 6/2005 |
| KR | 10-2017-0015723 A | 2/2017 |
| KR | 10-2017-0065223 A | 6/2017 |

\* cited by examiner

STEERING COLUMN ASSEMBLY FOR VEHICLE

CROSS REFERENCE TO RELATED APPLICATION(S)

The present application claims priority to Korean Patent Application No. 10-2017-0161270, filed on Nov. 29, 2017, the entire contents of which is incorporated herein for all purposes by this reference.

BACKGROUND OF THE INVENTION

Field of the Invention

The present invention relates generally to a steering column assembly for a vehicle and, more particularly, to a steering column assembly for a vehicle, which compensates for the distortion of a steering shaft and a clearance between the steering shaft and a steering housing accommodating the steering shaft while securely supporting the steering housing which is being tilted.

Description of Related Art

Generally, a steering column assembly for a vehicle is a device that transfers a rotation force of a steering wheel manipulated by a driver to wheels, and allows the adjustment of the steering wheel in a tilting angle and a longitudinal motion according to the driver's body type.

The steering column assembly includes a steering shaft coupled to a steering wheel, a steering housing in which the steering shaft is coupled in a tiltable and length-adjustable manner, a mounting bracket attached to a vehicle body along with the steering housing mounted thereto, and a motor driving a mechanism to adjust a longitudinal length and a tilt of the steering shaft.

However, a conventional steering column assembly has a problem in that vibration occurring during traveling of a vehicle is transferred up to the steering wheel, as well as the steering shaft and steering housing, of the steering column assembly in X, Y, Z directions, causing an unstable steering operation.

The vibrating phenomenon of the steering wheel caused due to the transfer of vibration of a vehicle to the steering column assembly in X, Y, Z directions results from a lack of both the rigidity and a shock-absorbing structure of respective parts of the steering column assembly.

Thus, to solve the present problem, a separate dynamic damper or the like is conventionally mounted to a proper position (e.g., the internal to the steering wheel) of the steering column assembly. However, the present solution causes an increase in the number of parts and the manufacturing cost, and cannot prevent the transfer of vibration to the steering wheel through the other parts of the steering column assembly yet.

Moreover, there are other problems in that in the event of an adjustment of the steering wheel in its tilt and longitudinal motion, friction force between the steering wheel and the steering housing increases so that the steering shaft itself suffers from distortion and contact noise occurs, and the steering housing and the steering wheel are further vibrated due to a lack of the support between the steering housing and the mounting bracket.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering column assembly for a vehicle, in which a buffer structure is provided between a steering housing and a steering shaft inserted into the steering housing to distribute vibration applied thereto and to compensate for the distortion of the steering shaft and a clearance of the steering shaft with the steering housing, and a support structure is also provided to secure the support performance of the steering housing with respect to a mounting bracket in the event of a tilt and a longitudinal motion of the steering housing, ensuring the horizontal rigidity of the steering housing and reducing vibration applied thereto.

In various aspects of the present invention, there is provided a steering column assembly for a vehicle, the assembly including: a steering shaft connected to a steering wheel; a steering housing into which the steering shaft is fixedly inserted into a tiltable and length-adjustable manner through a bearing section disposed at an intermediate position on an internal circumference of the steering housing; a tilting bracket coupled to opposite sides of one end side of the steering housing to adjust a tilt of the steering shaft; and a mounting bracket attached to a vehicle body along with the steering housing mounted thereto, wherein a spacer ring cover having a plurality of deformable buffers is disposed between the internal circumference of the steering housing and an external circumference of the bearing section to cover the bearing section to compensate for the distortion of the steering shaft and a clearance of the steering shaft with the steering housing.

The deformable buffers may be disposed at regular intervals along an internal circumference of the spacer ring cover, wherein each of the deformable buffers is of a 'T'-type section having a base portion integrally protruding from the internal circumference of the spacer ring cover and an end contact portion contacting the external circumference of the bearing section.

The spacer ring cover may be further circumferentially provided with a plurality of stopper ribs in an integral form to prevent the detachment of the bearing section accommodated in the spacer ring cover.

The steering housing may have first and second fixing protrusions disposed at positions adjoining opposite circumferential end portions of the spacer ring cover to fix the spacer ring cover.

The first fixing protrusion may protrude inwards from the internal circumference of the steering housing at a position adjoining one circumferential end portion of the spacer ring cover, and the second fixing protrusion may be a '⊏'-type cut portion bent inwards from the internal circumference of the steering housing at a position adjoining the other circumferential end portion of the spacer ring cover.

The steering housing may have a raised support block portion on opposite sides of one end side thereof at a position, to which the tilting bracket is coupled, to increase a contact area with the tilting bracket.

A buffer pad may be disposed between contact surfaces of the support block portion and the tilting bracket to reduce a clearance and friction between the contact surfaces.

The steering housing may have support protrusions on opposite sides, respectively, of one end side thereof, and the mounting bracket may have corresponding guide grooves on opposite sides, respectively, of one end side to engage with the support protrusions.

According to embodiments, the present invention has the following effects.

First, the spacer ring cover having deformable buffers is provided between the internal circumference of the steering housing and the external circumference of the steering shaft to cover the bearing section, easily compensating for the distortion of the steering shaft and a clearance around the steering shaft, as well as distributing vibration occurring from a vehicle.

Second, the supporting structure is provided to the steering housing and the mounting bracket to increase supporting performance of the steering housing with respect to the mounting bracket during the adjustment in a tilt and a longitudinal motion of the steering housing, obtaining the horizontal (left-right direction) rigidity of the steering housing as well as distribution and absorption of vibration.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

Figure 1:
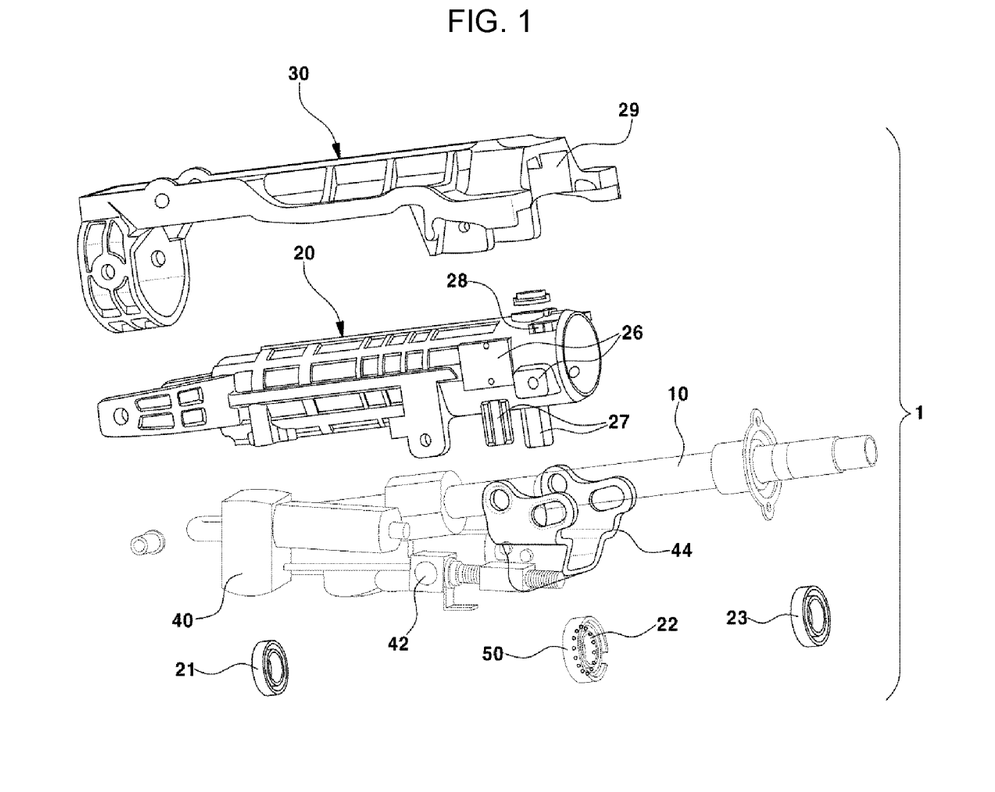
FIG. 1 is an exploded perspective view exemplarily illustrating a steering column assembly for a vehicle according to an exemplary embodiment of the present invention.
Figure 2:
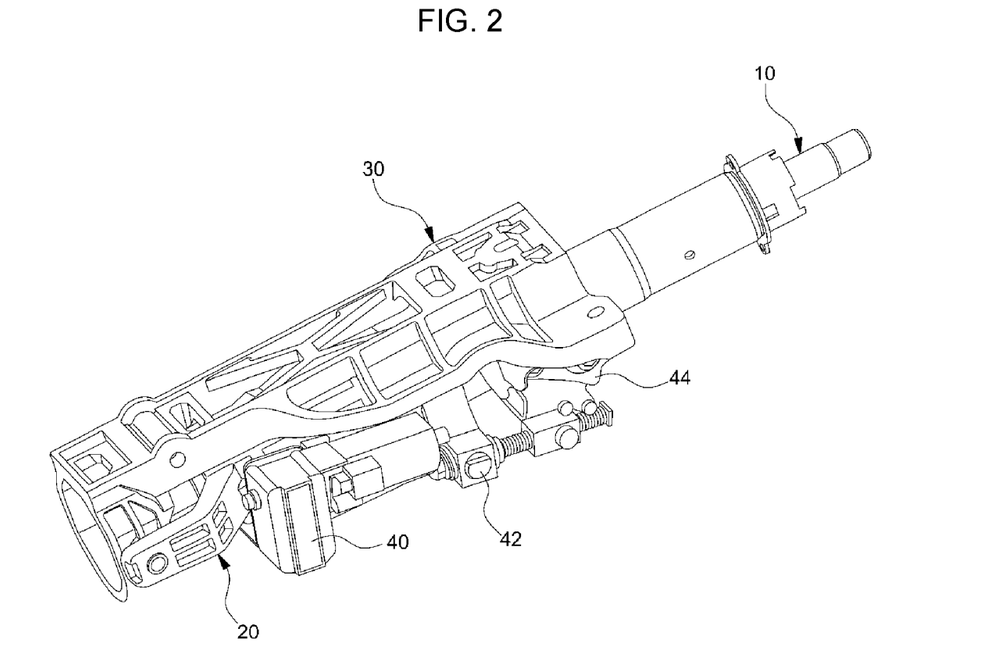
FIG. 2 is a perspective view of the steering column assembly.

As shown in FIG. 1 and FIG. 2, a steering column assembly 1 includes a steering shaft 10, a steering housing 20 in which the steering shaft 10 is coupled in a tiltable and length-adjustable manner, a mounting bracket 30 attached to a vehicle body along with the steering housing 20 mounted thereto, and a motor 40 driving a mechanism 42 to adjust a longitudinal length and a tilt of the steering shaft 10, wherein the mechanism 42 has a tilting bracket 44.

On opposite end portions of the steering shaft 10, a steering wheel for driver's steering operation and a steering mechanism for wheels are respectively coupled.

For reference, the steering shaft 10 has a splined double-tube structure to adjust a longitudinal motion of the steering wheel according to the driver's body type.

Furthermore, the tilting bracket 44 is mounted on opposite sides of one end side of the steering housing 20 to adjust a vertical tilt of the steering wheel according to the driver's body type. Thus, a tilting angle of the steering housing 20 and the steering shaft 10 inserted into the steering housing 20 is adjusted by the tilting operation of the tilting bracket 44.

Vibrations (traveling vibration, engine vibration, etc.) occurring from a vehicle are transferred to the steering column assembly in X, Y, Z directions to cause an unstable operation of the steering wheel.

The present invention aims at distributing and absorbing vibrations transferred to the steering column assembly and compensating for the distortion and clearance of the steering shaft.

Figure 3:
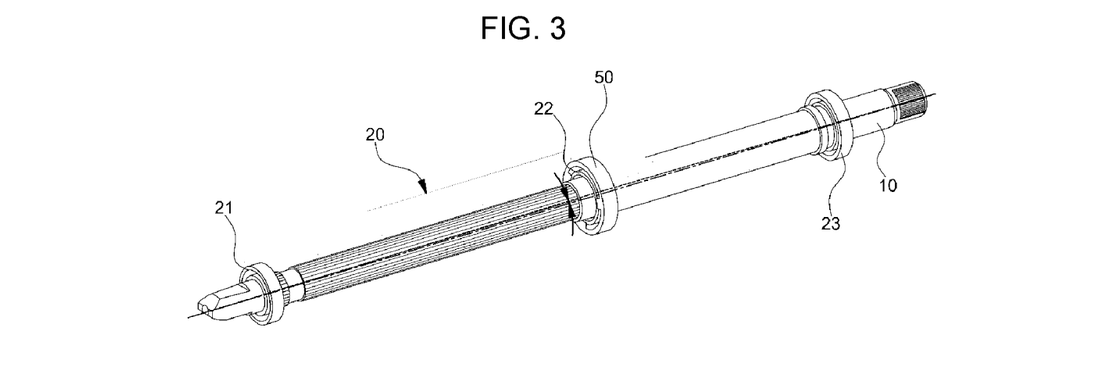
FIG. 3 is a schematic perspective view exemplarily illustrating the state of the steering column assembly in which bearing sections are disposed between the steering housing and the steering shaft.

FIG. 3 illustrates the state of the steering column assembly in which bearing sections are disposed between the steering housing and the steering shaft.

As illustrated in FIG. 3, the steering shaft 10 is accommodated in the steering housing 20, and three bearing sections are disposed on an internal circumference of the steering housing to ensure easy rotation and support of the steering shaft 10.

That is, the bearing sections 21, 22, 23 are disposed at front, intermediate, and rear positions, respectively, of the internal circumference of the steering housing 20, and the steering shaft 10 is mounted through the bearing sections 21, 22, 23 so that an external circumference of the steering shaft 10 is rotatably supported by internal circumferences of the bearing sections.

Here, the steering shaft 10 may suffer from the distortional deformation due to driving vibration and engine vibration of a vehicle, external force, an assembly tolerance, or the like, so that a clearance may occur between contact surfaces of the steering shaft 10 and the bearing sections.

To compensate for the distortion and clearance, a spacer ring cover 50 is provided to cover the intermediate bearing section 22, for example, among the bearing sections 21, 22, 23. That is, the spacer ring cover is disposed between the external circumference of the bearing section 22 and the internal circumference of the steering housing 20.

Figure 4A:
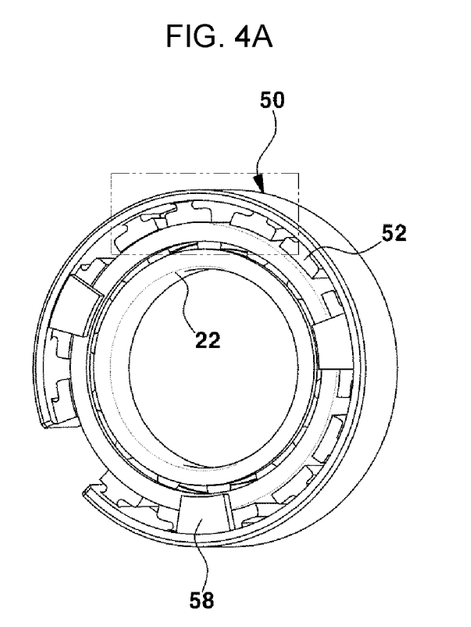
FIG. 4A and FIG. 4B are perspective views exemplarily illustrating a spacer ring cover accommodating the bearing section disposed at an intermediate portion of an internal circumference of the steering housing.
Figure 4B:
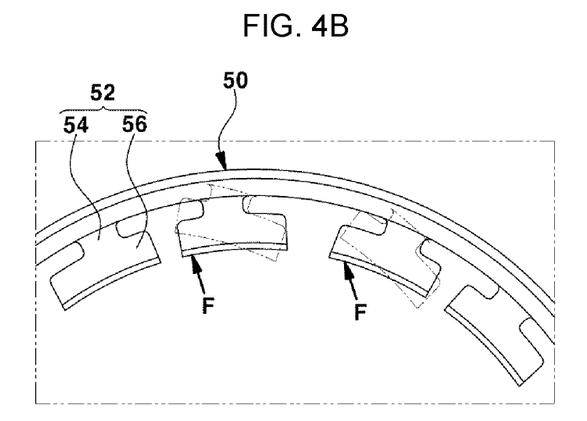
Figure 5A:
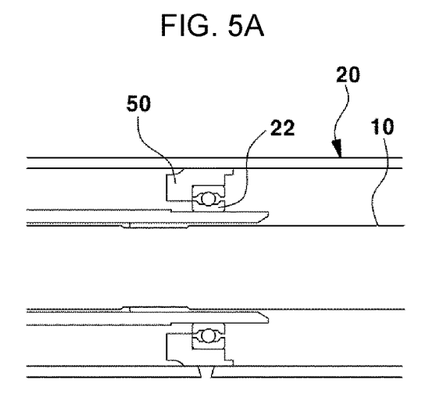
FIG. 5A, FIG. 5B, FIG. 5C, FIG. 5D, and FIG. 5E are views exemplarily illustrating the configuration of the fixing the position of the spacer ring cover on the internal circumference of the steering housing.
Figure 5B:
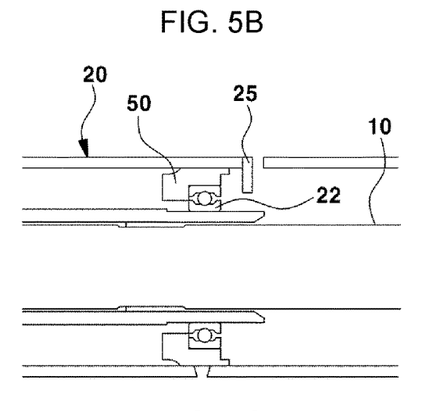
Figure 5C:
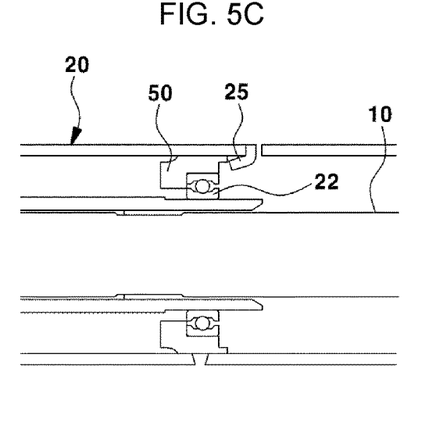
Figure 5D:
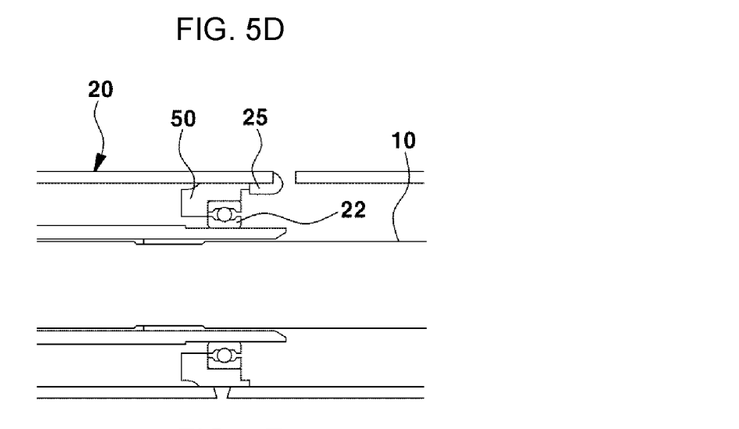
Figure 5E:
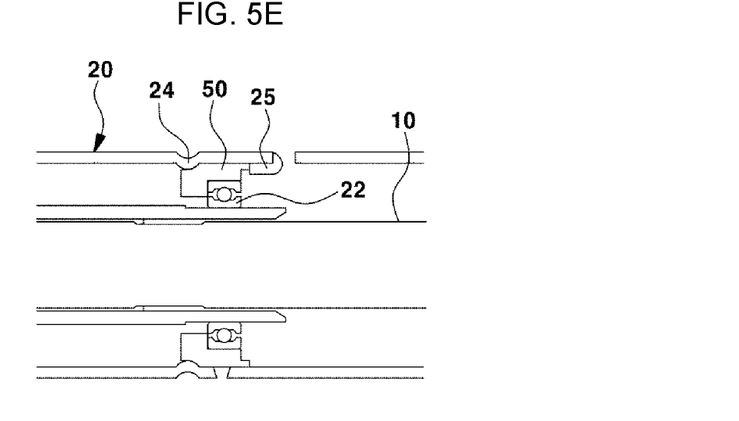

The spacer ring cover 50 has a plurality of deformable buffers 52 which is brought into contact with the external circumference of the bearing section 22 to compensate for the distortion of the steering shaft 10 and the clearance between the steering shaft and the bearing section.

The deformable buffers 52 are disposed at regular intervals along an internal circumference of the spacer ring cover 50, wherein each of the deformable buffers 52 is of a 'T'-type section having a base portion 54 integrally protruding from the internal circumference of the spacer ring cover 50 and an end contact portion 56 contacting the external circumference of the bearing section 22.

Thus, the spacer ring cover 50 is inserted into the steering housing 20, along with the bearing section 22 accommodated in the spacer ring cover 50 in a contact state with (the internal circumference of) the end portion contact parts 56.

Here, since there is a risk of the detachment of the bearing section 22 out of the spacer ring cover 50, the spacer ring cover 50 is circumferentially provided with a plurality of stopper ribs 58 in an integral form to prevent the detachment of the bearing section 22 accommodated in the spacer ring cover. Thus, since the bearing section 22 is supported by the stopper ribs 58 on one side thereof, the bearing section 22 may be prevented from being detached from the spacer ring cover 50.

Thus, when the steering shaft 10 is distorted due to driving vibration and engine vibration of a vehicle, external force, assembly tolerance, or the like, as shown in FIG. 4A and FIG. 4B, the bearing section 22, through which the steering shaft 10 is mounted, is also moved in the distorting direction to deform the end portion contact parts 56 of the buffers 52 relative to the base portion 54, compensating for the distortion of the steering shaft and the clearance between the steering shaft and the bearing section.

Figure 10:
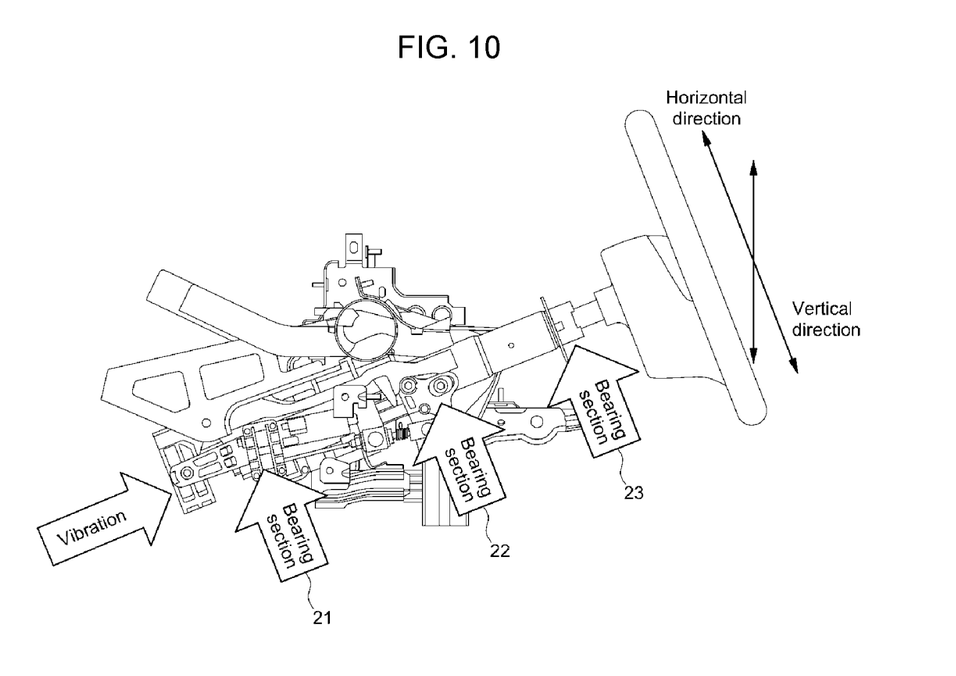
FIG. 10 is a side view exemplarily illustrating the function of the bearing sections mounted to the steering column assembly.

When the steering shaft 10 does not suffer from the distortion due to the driving vibration and engine vibration of a vehicle, external force, assembly tolerance, or the like, as shown in FIG. 10, a variety of vibrations are distributed and absorbed while the steering shaft 10 is rotatably supported by the bearing sections 21, 22, 23.

In the meantime, since the spacer ring cover 50 may be movable from an original position in a longitudinal direction along the internal circumference of the steering housing 20, it is required to fix the spacer ring cover 50 in position in the steering housing 20.

To the present end, as shown in FIG. 5A, FIG. 5B, FIG. 5C, FIG. 5D, and FIG. 5E, the steering housing 20 has first and second fixing protrusions 24, 25 disposed at positions adjoining opposite circumferential end portions of the spacer ring cover 50 to fix the spacer ring cover in position.

The first fixing protrusion 24 protrudes inwards from the internal circumference of the steering housing 20 at a position adjoining one circumferential end portion of the spacer ring cover 50, preventing the movement of the spacer ring cover at that position. Here, the first protrusion may be formed by point-striking the external circumference of the steering housing 20.

Furthermore, the second fixing protrusion 25 is a '⊏'-type cut portion bent inwards from the internal circumference of the steering housing 20 at a position adjoining the other circumferential end portion of the spacer ring cover 50, preventing the movement of the spacer ring cover at that position.

In the meantime, vibrations transferred to the steering column assembly may shake the steering shaft 10 and the steering housing 20 in a horizontal direction as well as a vertical direction thereof, and thus may increase a clearance between the steering housing 20 and the tilting bracket 44. This is added because of a lack of supporting rigidity and supporting area of the steering housing 20 with respect to the tilting bracket 44.

Figure 6:
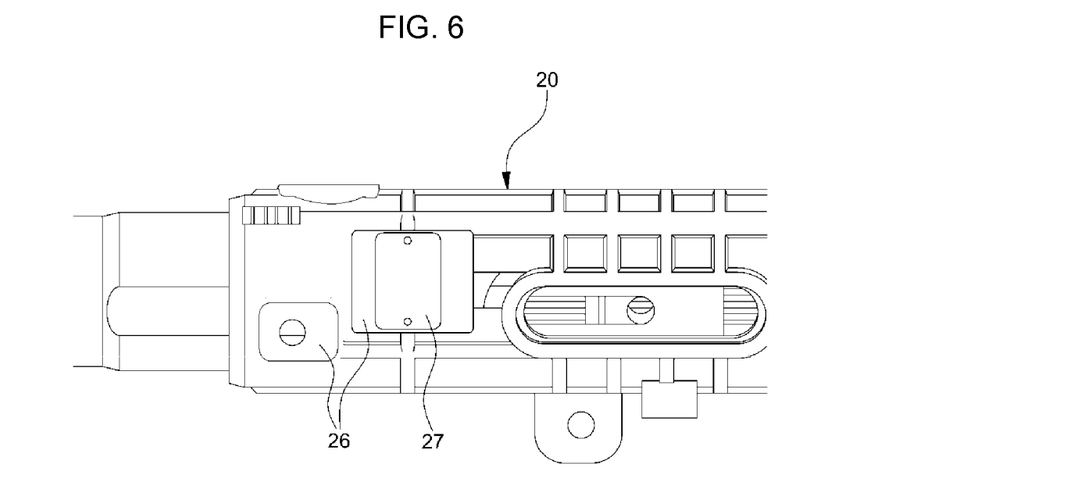
FIG. 6 and FIG. 7 are perspective views respectively illustrating a supporting feature and a coupling structure between the steering housing and a tilting bracket.
Figure 7:
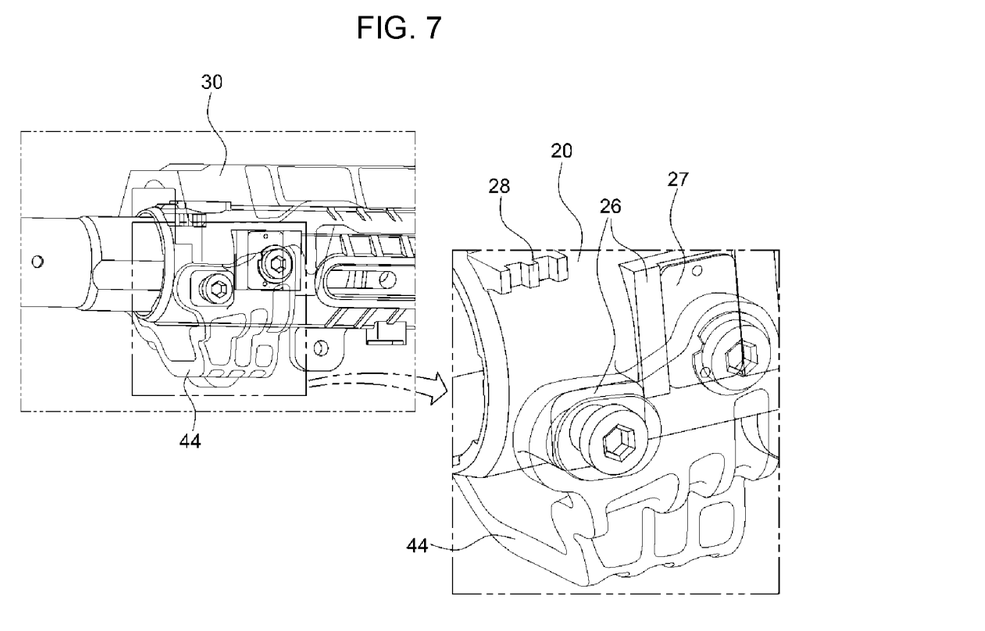
Figure 8:
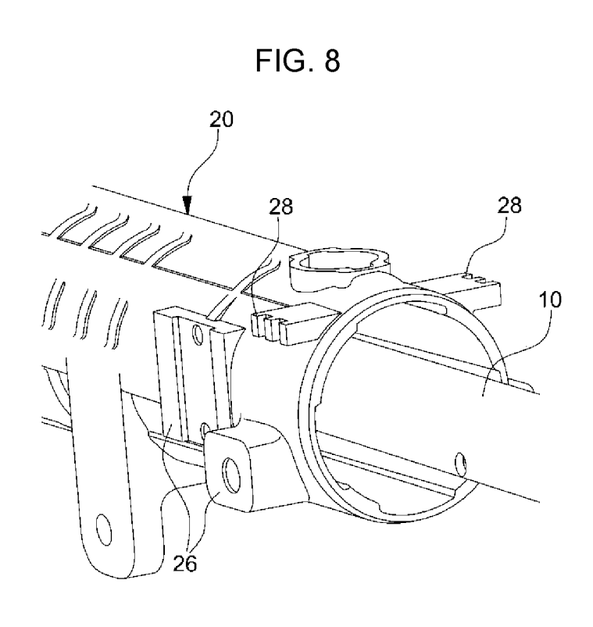
FIG. 8 is a perspective view exemplarily illustrating the steering housing having support protrusions.

To increase the supporting rigidity and area of the steering housing 20 with respect to the tilting bracket 44, as shown in FIG. 6 and FIG. 7, the steering housing 20 has a raised support block portion 26 on opposite sides of one end side thereof at a position, to which the tilting bracket 44 is coupled, to increase a contact area with the tilting bracket 44.

Thus, since the supporting rigidity and area of the steering housing 20 with respect to the tilting bracket 44 are increased by the presence of the support block portion 26, even when the vibrations of a vehicle are transferred to a connection between the steering housing 20 and the tilting bracket 44, the vibrations may be distributed and absorbed by the support block portion 26.

Here, such an increase in the contact area between the steering housing 20 and the tilting bracket 44 may also cause an increase in the friction force and clearance between the steering housing 20 and the tilting bracket 44 in the event of tilting of the steering housing 20. To prevent the present problem, a buffer pad 27 is disposed on the support block portion 26 to reduce a clearance and friction between the contact surfaces of the steering housing and the tilting bracket.

In the meantime, the horizontal (left-right) vibration of the steering housing 20 is caused from a lack of the supporting rigidity and area of the steering housing with respect to the mounting bracket 30.

Thus, to increase the supporting rigidity and area of the steering housing 20 with respect to the mounting bracket 30, as shown in FIG. 8 and FIG. 9A, FIG. 9B, and FIG. 9C, the steering housing 20 has support protrusions 28 on opposite sides, respectively, of one end side thereof, and the mounting bracket 30 has corresponding guide grooves 29 on opposite sides, respectively, of one end side to engage with the support protrusions 28.

Figure 9A:
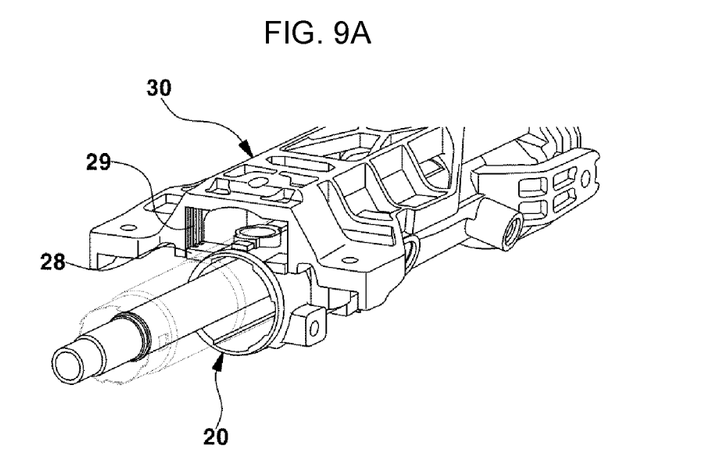
FIG. 9A, FIG. 9B, and FIG. 9C are perspective views exemplarily illustrating the coupled state between the steering housing and the mounting bracket during the tilting operation of the steering housing.
Figure 9B:
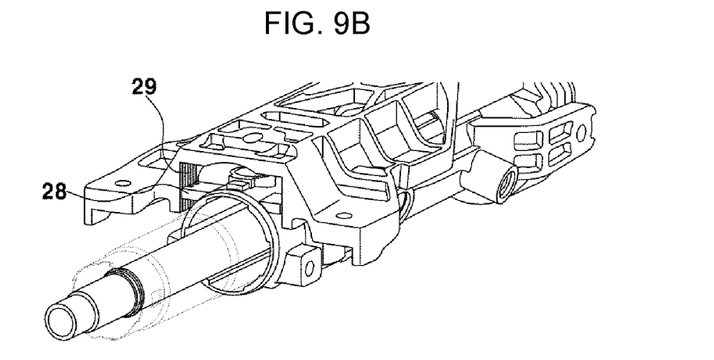
Figure 9C:
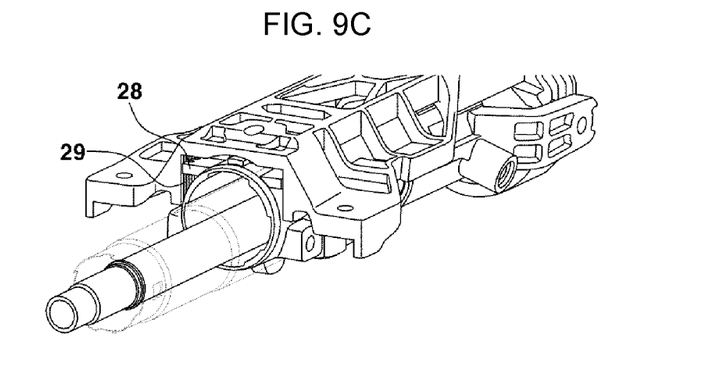

Thus, as shown in FIG. 9A, FIG. 9B, and FIG. 9C, when the steering housing 20 is tilted, the support protrusions 28 of the steering housing 20 are stably supported in the guide grooves 29 of the mounting bracket 30, securing the horizontal rigidity and distributing and absorbing the horizontal vibrations of the steering housing 20 as well.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering column assembly for a vehicle, the assembly comprising:
   a steering shaft connected to a steering wheel;
   a steering housing into which the steering shaft is inserted into a tiltable and length-adjustable manner through a bearing section disposed at a position on an internal circumference of the steering housing;
   a tilting bracket coupled to opposite sides of one end of the steering housing to adjust a tilting amount of the steering shaft; and
   a mounting bracket attached to a vehicle body, wherein the steering housing is mounted to the mounting bracket,
   wherein a spacer ring cover having a plurality of deformable buffers is disposed between the internal circumference of the steering housing and an external circumference of the bearing section to cover the bearing section to compensate for a distortion of the steering shaft and a clearance of the steering shaft with the steering housing.

2. The steering column assembly according to claim 1, wherein the plurality of deformable buffers is disposed in a predetermined interval along an internal circumference of the spacer ring cover, and
   wherein each of the plurality of deformable buffers is of a 'T'-shape having a base portion integrally protruding from the internal circumference of the spacer ring cover and an end contact portion contacting the external circumference of the bearing section.

3. The steering column assembly according to claim 2, wherein the spacer ring cover further includes a plurality of stopper ribs provided on a side of the spacer ring cover along a circumferential direction of the spacer ring cover and facing the bearing section to prevent the bearing section accommodated in the spacer ring cover from being detached from the spacer ring cover.

4. The steering column assembly according to claim 1, wherein the steering housing has first and second fixing protrusions disposed at positions adjacent to opposite circumferential end portions of the spacer ring cover to fix the spacer ring cover therewith.

5. The steering column assembly according to claim 4, wherein the first fixing protrusion is formed protrudingly inwards from the internal circumference of the steering housing at a position adjacent to a first circumferential end portion of the spacer ring cover.

6. The steering column assembly according to claim 4, wherein the second fixing protrusion has a 'C'-type cut portion bent inwards from the internal circumference of the steering housing at a position adjacent to a second circumferential end portion of the spacer ring cover.

7. The steering column assembly according to claim 1, wherein the steering housing has a support block portion on opposite sides of one end side thereof at a position, to which the tilting bracket is coupled, thereby increasing a contact area with the tilting bracket.

8. The steering column assembly according to claim 7, wherein a buffer pad is disposed between contact surfaces of the support block portion and the tilting bracket to reduce a clearance and friction between the contact surfaces.

9. The steering column assembly according to claim 1,
   wherein the steering housing has support protrusions on opposite sides, respectively, of one end side of the steering housing, and
   wherein the mounting bracket has corresponding guide grooves on opposite sides, respectively, of one end side of the mounting bracket to engage with the support protrusions.

* * * * *